United States Patent [19]
Wasilewski

[11] Patent Number: 5,420,866
[45] Date of Patent: May 30, 1995

[54] METHODS FOR PROVIDING CONDITIONAL ACCESS INFORMATION TO DECODERS IN A PACKET-BASED MULTIPLEXED COMMUNICATIONS SYSTEM

[75] Inventor: Anthony J. Wasilewski, Alpharetta, Ga.

[73] Assignee: Scientific-Atlanta, Inc., Atlanta, Ga.

[21] Appl. No.: 219,648

[22] Filed: Mar. 29, 1994

[51] Int. Cl.⁶ .......................... H04K 1/00; H04L 9/18
[52] U.S. Cl. ................................ 370/110.1; 348/474; 380/10; 380/43
[58] Field of Search ............... 370/60, 94.1, 110.1; 348/460, 465, 474; 380/10, 20, 21, 42, 43, 47

[56] References Cited

U.S. PATENT DOCUMENTS 5,319,707  6/1994  Wasilewski et al. ............. 380/10 X

OTHER PUBLICATIONS

Wasilewski, A., "Universal Multi-Program Multiplex and Transport for MPEG-2 Systems", International Organization for Standardization, ISO/IEC JTC1/SC29/WG11 MPEG 93/170, (Jan. 1993).
Wasilewski, A., "Requirements and Method for High-Level Multiplexing of MPEG and Other Digital Service Bitstreams with Universal Transport Layer", International Organization for Standardization, ISO/IEC JTC1/SC2/WG11 MPEG 92/754, (Nov. 1992).
Wasilewski, A., "An MPEG-2 Multi-Program Multiplex Syntax", International Organization for Standardization, ISO/IEC JTC1/SC29/WG11 MPEG 93/173, (Jan. 1993).

*Primary Examiner*—Melvin Marcelo
*Attorney, Agent, or Firm*—Woodcock, Washburn, Kurtz, Mackiewicz & Norris

[57] ABSTRACT

In a packet-based multiplexed communications system, a method of providing different sets of conditional access information to a remote location comprises the steps of: (a) for each different set of conditional access information, inserting the set of conditional access information into a respective sequence of transport packets and assigning a unique packet ID to the transport packet of that sequence; (b) generating a table that specifies, for each of the different sets of conditional access information, the packet ID of the transport packets that carry that set of conditional access information; and (c) transmitting the table and the transport packets that carry each of the different sets of conditional access information to the remote location along with other information bearing transport packets. A decoder at the remote location can employ the transmitted table to identify and extract the transport packets that carry a selected one of the sets of conditional access information.

9 Claims, 10 Drawing Sheets

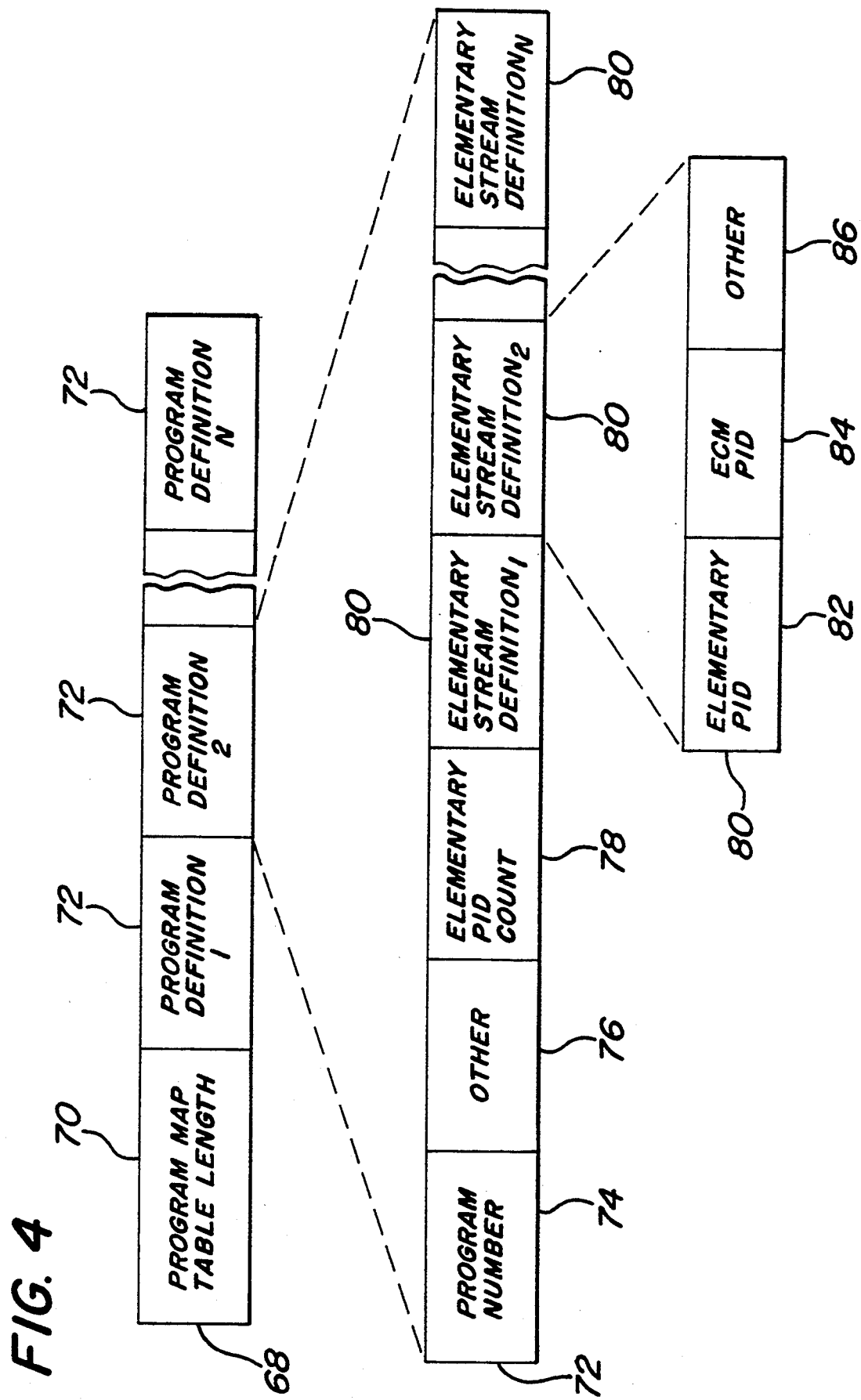

METHODS FOR PROVIDING CONDITIONAL ACCESS INFORMATION TO DECODERS IN A PACKET-BASED MULTIPLEXED COMMUNICATIONS SYSTEM

FIELD OF THE INVENTION

The present invention relates to digital communications systems, and more particularly, to a method for providing conditional access information to decoders in a multiplexed communications system.

BACKGROUND OF THE INVENTION

Recently, the International Organization for Standardization (ISO) adopted a standard protocol for combining one or more "elementary streams" of coded video, audio or other data into a single bitstream suitable for transmission. The standard (ISO 13818), hereinafter referred to as the "MPEG-2 Systems" standard, is described in detail in the MPEG-2 Systems Committee Draft (ISO/IEC JTC1/SC29/WG11/N0601, November, 1993) [hereinafter "MPEG-2 Systems Committee Draft"], which is hereby incorporated by reference. An overview of the MPEG-2 Systems standard is provided in Wasilewski, *The MPEG-2 Systems Specification: Blueprint for Network Interoperability* (Jan. 3, 1994), which is also hereby incorporated by reference. The MPEG-2 Systems standard provides a syntax and set of semantic rules for the construction of bitstreams containing a multiplexed combination of one or more "programs." A "program" is composed of one or more related elementary streams. An "elementary stream" is the coded representation of a single video, audio or other data stream that shares the common timebase of the program of which it is a member. For example, in the context of a subscription television system, a "program" may comprise a network television broadcast consisting of two elementary streams: a video stream and an audio stream.

As the MPEG-2 Systems standard developed, a two-level packet-based multiplexing scheme emerged. At the first level, each elementary stream to be transmitted, i.e., the coded data for one video, audio or other data stream, is packetized to form a Packetized Elementary Stream (PES). Each PES packet in a given Packetized Elementary Stream consists of a PES packet header followed by a variable length payload containing the coded data of that elementary stream. The Packetized Elementary Stream structure provides a means for packaging subparts of a longer elementary stream into consecutive packets along with associated indicators and overhead information used to synchronize the presentation of that elementary stream with other related elementary streams (e.g., elementary streams of the same program). Each elementary stream, in its Packetized Elementary Stream format, is assigned a unique "Packet ID" (PID). For example, the video elementary stream for a network television program may be assigned a PID of "10", and the audio elementary stream for that program may be assigned a PID of "23", and so on.

At the second level, one or more Packetized Elementary Streams may be further segmented or "packetized" to facilitate combining those streams into a single bitstream for transmission over some medium. Ultimately, two different "second level" protocols for combining one or more Packetized Elementary Streams into a single bitstream emerged: 1) the Program Stream (PS) protocol and 2) the Transport Stream protocol. Both stream protocols are packet-based and fall into the category of "transport layer" entities, as defined by the ISO Open System Interconnection (OSI) reference model. Program Streams utilize variable-length packets and are intended for "error-free" environments in which software parsing is desired. Program Stream packets are generally relatively large (1K to 2K bytes). Transport Streams utilize fixed length packets and are intended for transmission in noisy or errored environments. Each Transport Stream packet comprises a header portion and a payload portion. Transport Stream packets have a relatively short length of 188 bytes and include features for enhanced error resiliency and packet loss detection. The remaining background discussion will focus primarily on the MPEG-2 Transport Stream protocol.

As finally adopted, the Transport Stream protocol provides a standard format (i.e., syntax and set of semantic rules) for combining one or more Packetized Elementary Streams into a single "Transport Stream" that may then be transmitted over some medium. Essentially, the individual packets of each Packetized Elementary Stream are segmented and inserted into the payload sections of successive Transport Packets. That is/each Packetized Elementary Stream is inserted into a respective sequence of Transport Packets. The PID associated with a given Packetized Elementary Stream is then inserted into the headers of each Transport Packet that carries data from that Packetized Elementary Stream.

The Transport Packets formed from each Packetized Elementary Stream are then multiplexed to form a single outgoing bitstream or "Transport Stream." Thus, a Transport Stream comprises a continuous sequence of Transport Packets, each of which may carry data from one of a plurality of Packetized Elementary Streams. FIG. 1 graphically illustrates this two level multiplexing approach. As shown, an elementary stream 2, which may comprise a stream of coded video or audio data, is segmented and inserted into the payloads of a plurality of successive packets 4 to form a Packetized Elementary Stream. Each packet 4 of the Packetized Elementary Stream is then segmented and inserted into the payloads of a consecutive sequence of Transport Packets 6. The header of each Transport Packet 6 will contain the PID associated with that elementary stream 2.

As explained above, the Transport Packets formed from a number of different elementary streams are then multiplexed to form a single outgoing Transport Stream. At a decoder location, a given elementary stream can be recovered from the incoming Transport Stream by simply extracting every incoming Transport Packet whose header contains the PID assigned to that elementary stream. A group of related elementary streams (e.g. audio, video etc.) can be extracted to reproduce a complete "program." The two-level packet-based multiplexing approach of the MPEG-2 Systems standard can be used in a wide variety of applications. For example, such a multiplexing approach is particularly well suited for the transmission of audio and video programming in a subscription television system, such as a CATV or Direct Broadcast Satellite (DBS) system.

As originally proposed by Applicant and ultimately adopted by the MPEG-2 Systems Committee, each "program" (i.e., a combination of related elementary streams) carried in a given Transport Stream is assigned a unique "program number" to facilitate selection of a program for viewing at a decoder location. To facilitate extraction of a selected program from an incoming Transport Stream, a Program Map Table is transmitted to the decoder that contains a "program definition" for each user selectable program number. The program definition for a given program number identifies which elementary streams in the incoming Transport Stream "make-up" that program. Specifically, the program definition for a given program specifies the Packet IDs associated with each elementary stream of the selected program. For example, a television program will typically comprise a video elementary stream and an associated audio elementary stream. The program definition for that television program will contain two PID values, one that identifies the video elementary stream and one that identifies the audio elementary stream. Once the PID's are known, the decoder can simply extract every incoming Transport Packet whose header contains a PID that matches one of those listed in the program definition. The audio and video elementary stream data can then be recovered from the extracted Transport Packets and processed for output to a television or other device.

As the MPEG-2 Systems standard developed, it was suggested by members of the MPEG-2 Systems Committee that the standard accommodate encryption or scrambling of elementary stream data on an individual stream basis. Ultimately, the MPEG-2 Systems Committee decided that encryption of elementary stream data could be performed at the Transport Packet level. Specifically, when it is desired to encrypt a given elementary stream, rather than encrypting the elementary stream data in its raw form, encryption can be performed by encrypting the payload portion of each Transport Packet that carries data of that elementary stream.

At this point it is important to note that the MPEG-2 Systems standard does not dictate the mechanism or algorithm by which elementary streams are to be encrypted or scrambled. Rather, individual system vendors may employ their own proprietary encryption schemes. What the MPEG-2 Systems standard recognizes, however, is that any encryption or scrambling technique will require that encryption related information be transmitted to system decoders in order to facilitate decryption or descrambling at each decoder.

For example, it is expected that many vendors of MPEG-2 compliant transmission systems will implement private-key cryptographic techniques for uniquely encrypting different elementary streams. With private key cryptography, encryption control words (sometimes also referred to as encryption seeds) are generated at the encryption site and are used to "key" the encryption algorithm in order to produce a pseudo-random binary sequence, sometimes referred to as a "key stream". Many private key cryptographic systems are expected to employ the well known Data Encryption Standard (DES) algorithm. Encryption of a clear data stream, such as the elementary stream data in the payload section of a Transport Packet, is accomplished by combining the clear data with the key stream in a pre-defined manner, such as, for example, by performing a bitwise exclusive-OR operation on the two streams. In an MPEG-2 compliant system, unique encryption of each elementary stream can be achieved simply by employing different encryption control words for each elementary stream. Decryption of a given elementary stream at a decoder can only be performed if the decoder is provided with the encryption control words used to encrypt that elementary stream. Accordingly, it will be necessary in any MPEG-2 system that employs private key cryptography to provide a mechanism for transmitting encryption control words, and other encryption related information, to each decoder.

As development of the MPEG-2 Systems standard progressed, the MPEG-2 Systems Committee decided that encryption related information (sometimes referred to in the art as "conditional access information") would be transmitted to decoders in the form of Entitlement Control Messages (ECMs). Each ECM typically will contain encryption or scrambling related information for only one of the elementary streams in a given Transport Stream. As such, an ECM is stream-specific. For example, in a system employing a private-key cryptographic technique, an ECM may be used to transmit the encryption control words necessary for decrypting a particular elementary stream. ECMs for a given elementary stream may be transmitted in dedicated Transport Packets, or alternatively, may be transmitted in "adaptation fields" of the Transport Packets that carry that elementary stream. ECMs can be retrieved by a decoder in order to decrypt the elementary stream data of a user selected program.

It should be noted that the MPEG-2 Systems standard does not dictate the content or format of an ECM. The MPEG-2 Systems standard merely dictates how ECMs are to be transmitted within a given Transport Stream. Details of the encryption hardware and the content of an ECM are left to individual system vendors. Accordingly, a vendor supplying encoding and decoding equipment that operates in accordance with the MPEG-2 Systems standard may develop its own encryption scheme and associated ECM format.

Applicant and his Assignee have been actively involved in the development of the MPEG-2 Systems standard and have contributed to various aspects of the standard. As Applicant recognized during development of the encryption related aspects of the MPEG-2 Systems standard, because each ECM in a given Transport Stream relates to a particular elementary stream, a mechanism is needed for identifying which ECMs are associated with each elementary stream. For example, when a decoder begins extracting the Transport Packets that contain the elementary streams of a selected program, the decoder must be able to locate and extract the ECMs that contain the encryption related information necessary for descrambling or decrypting each of those elementary streams.

Applicant further recognized that in many applications, particularly subscription television applications, it is desirable to provide various decoders in the system with other decoder specific and/or system-wide "conditional access" information. For example, it is often desirable to transmit authorization information to various decoders or groups of decoders for controlling access to different programs or tiers of programs in a given Transport Stream. Recognizing the need to provide such decoder specific and/or system wide conditional access information to decoders, it was suggested by the MPEG-2 Systems Committee that such information could be transmitted to decoders in the form of Entitlement Management Messages (EMMs), which would be similar to the ECMs used to transmit stream-specific conditional access information. The concept of an Entitlement Management Message is well known in the prior art. Applicant realized, however, that in a typical application, such as a subscription television application, it is likely that a number of different vendors might provide decoders to different subscribers in the same system. Each vendor's decoder will most likely operate in accordance with that vendor's own proprietary conditional access subsystem. Consequently, it will be necessary to transmit different EMM streams to support each of the different conditional access systems being employed. As a result, a mechanism will be needed for directing each decoder to the appropriate EMMs carried in a given Transport Stream.

Applicant's invention addresses both of the foregoing needs by providing novel methods for locating conditional access information transmitted in a packet-based multiplexed communications system, such as an MPEG-2 compliant communications system. Applicant, on behalf of his Assignee, proposed the methods of the present invention for inclusion in the MPEG-2 Systems standard, and the methods of the present invention, as defined by the appended claims, were substantially adopted as part of the MPEG-2 Systems standard. Applicant described his proposal in a paper presented to the International Standards Organization (ISO), entitled "Syntax Proposal for MPEG-2 Transport Stream Program Specific Information", ISO/IEC JTC1/SC29/WG11 MPEG 93/612 (July, 1993), which is hereby incorporated by reference.

SUMMARY OF THE INVENTION

The present invention is directed to methods for providing conditional access information to decoders in a packet-based multiplexed communications system wherein a plurality of different elementary streams are each segmented and inserted into respective transport packets that are then multiplexed to form a single transport stream for transmission to a remote location. More specifically, the present invention is directed to methods for providing a plurality of different sets of conditional access information to a remote location and for facilitating access to a selected one of those sets of conditional access information by a decoder at the remote location. Generally, the methods of the present invention comprise the steps of: (a) for each set of conditional access information, inserting the set of conditional access information into a respective sequence of transport packets, assigning a unique packet ID to that set of conditional access information and inserting the unique packet ID in a header section of each transport packet of the sequence that carries that set of conditional access information; (b) generating a table that specifies, for each set of conditional access information, the packet ID of the transport packets that carry that set of conditional access information; and (c) transmitting the table and the transport packets that carry each of the different sets of conditional access information to the remote location along with the transport packets that carry the different elementary streams. A decoder at the remote location can employ the transmitted table to identify and extract the transport packets that carry a selected one of the sets of conditional access information.

This general method is employed in one embodiment of the present invention to provide stream-specific encryption related information to a remote location. In particular, when the elementary streams to be transmitted to the remote location are separately and uniquely encrypted prior to transmission, encryption related information specific to each elementary stream is generated and must be provided to the remote location for decryption purposes. A method of providing the encryption related information for each elementary stream to the remote location in accordance with the present invention comprises the steps of: (a) for each elementary stream, inserting the encryption related information for that elementary stream into a respective sequence of transport packets; (b) generating a table that specifies, for each elementary stream, which of the transport packets generated in step (a) carry the encryption related information for that elementary stream; and (c) transmitting the table and the transport packets that carry the encryption related information for each elementary stream to the remote location along with the transport packets that carry the encrypted data of each elementary stream. Preferably, in step (a), for each elementary stream, a unique packet ID is assigned to the encryption related information for that elementary stream and the unique packet ID is then inserted in a header section of each transport packet that carries a portion of the encryption related information for that elementary stream. The table generated in step (b) then preferably specifies, for each elementary stream, the packet ID of the transport packets that carry the encryption related information for that elementary stream. A decoder at the remote location can access the table to identify which transport packets transmitted in step (c) carry the encryption related information for a selected one of the elementary streams. In an application wherein different groups of related elementary streams define a plurality of different programs, the aforementioned table is preferably incorporated as part of a Program Map Table that specifies, for each of the different programs, which of the different elementary streams comprise that program.

Another embodiment of the present invention is applicable to a packet-based multiplexed communications system in which a transport stream is to be transmitted to a plurality of different remote locations, wherein each remote location employs a decoder that operates in accordance with one of a plurality of different conditional access systems. In such a system, a different set of conditional access information must be carried in the transport stream to support each of the different conditional access systems employed by the various decoders in the system. A method of providing each of the different sets of conditional access information to the remote locations in accordance with the present invention comprises the steps of: (a) for each different set of conditional access information, inserting the set of conditional access information into a respective sequence of transport packets, assigning a unique packet ID to that set of conditional access information and inserting the unique packet ID in a header section of each transport packet that carries a portion of that set of conditional access information; (b) generating a table that specifies, for each of the different conditional access systems, the packet ID of the transport packets that carry the set of conditional access information for that conditional access system; and (c) transmitting the table and the transport packets that carry each of the different sets of conditional access information to the remote location along with the transport packets that carry the different elementary streams. A decoder at one of the remote locations, which operates in accordance with one of the different conditional access systems, can employ the transmitted table to identify and extract the transport packets that carry the set of conditional access information for the conditional access system upon which that decoder operates. In a preferred embodiment, each of the different sets of conditional access information comprises a plurality of Entitlement Management Messages unique to a particular one of the different conditional access systems.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 4 illustrates the general content and arrangement of a Program Map Table in accordance with an embodiment of the present invention;

DETAILED DESCRIPTION OF THE PREFERRED EMBODIMENTS

Because the present invention, as defined by the appended claims, has been substantially incorporated into the MPEG-2 Systems standard (ISO 13818), the present invention is described below in the context of a packet-based multiplexed communications system that operates in accordance with the MPEG-2 Systems standard. However, it is understood that the methods of the present invention are by no means limited to systems that operate in accordance with the MPEG-2 Systems standard. Rather, the present invention may be employed in any packet-based multiplexed communications system in which it is desirable to provide conditional access information to decoders in the system.

Figure 2:
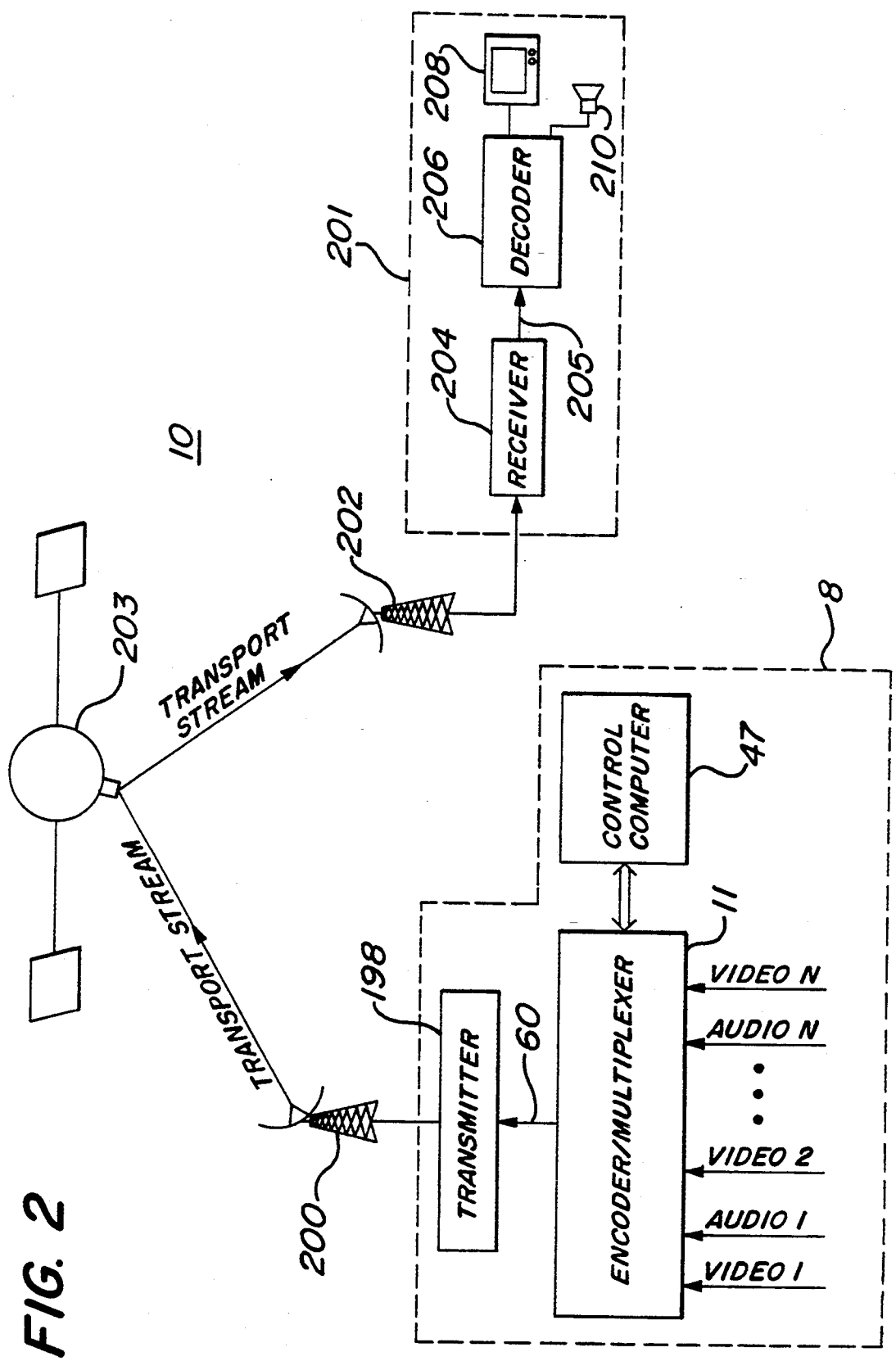
FIG. 2 illustrates an application of the present invention to a subscription television system.

Referring now to the drawings, wherein like numerals indicate like elements throughout, FIG. 2 illustrates an application of the methods of the present invention to a direct broadcast satellite (DBS) subscription television system 10 that operates in accordance with the MPEG-2 Systems standard. As shown in FIG. 2, the exemplary DBS system 10 comprises an uplink site 8 for generating an MPEG-2 Transport Stream containing a multiplexed combination of audio and video signals and for transmitting the transport stream to one or more subscriber locations, e.g. location 201. The audio and video signals (e.g., Video 1, Audio 1 ... Video N) are input to an encoder/multiplexer 11 via respective input lines. The encoder/multiplexer 11 operates in accordance with the MPEG-2 Systems standard and the methods of the present invention to generate a continuous Transport Stream comprising a time-division multiplexed combination of Transport Packets, each of which may contain the coded data of one of the video or audio signals or may contain conditional access related information in accordance with the present invention. As the transport stream is generated, it is supplied via line 60 to a transmitter 198 and then to a satellite uplink 200 for transmission via satellite 203 to the subscriber location 201. The Transport Stream is typically transmitted over a particular transponder frequency.

At the subscriber location 201, a receiver 204 is tuned to the particular transponder frequency for receiving the transport stream via a satellite down-link 202. The incoming Transport Stream is then provided to a decoder 206 via line 205. A subscriber can employ the decoder 206 to retrieve the audio and video signals of a particular program from the incoming Transport Stream for output to a television set 208 or audio output device 210 at the subscriber location 201.

Figure 3A:
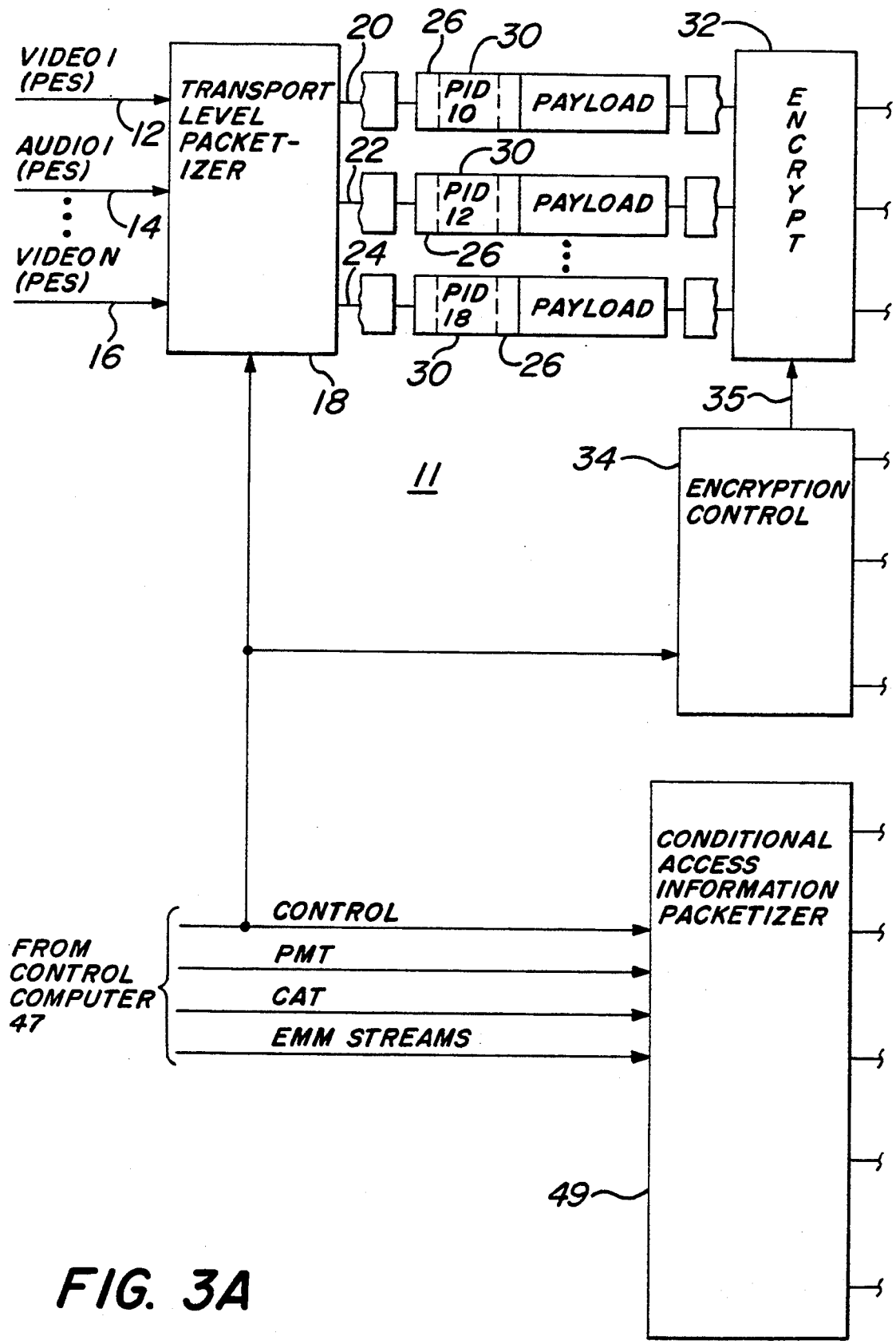
FIGS. 3A and 3B are a functional block diagram of an encoder apparatus for generating a Transport Stream and for providing conditional access information in accordance with the methods of the present invention.
Figure 3B:
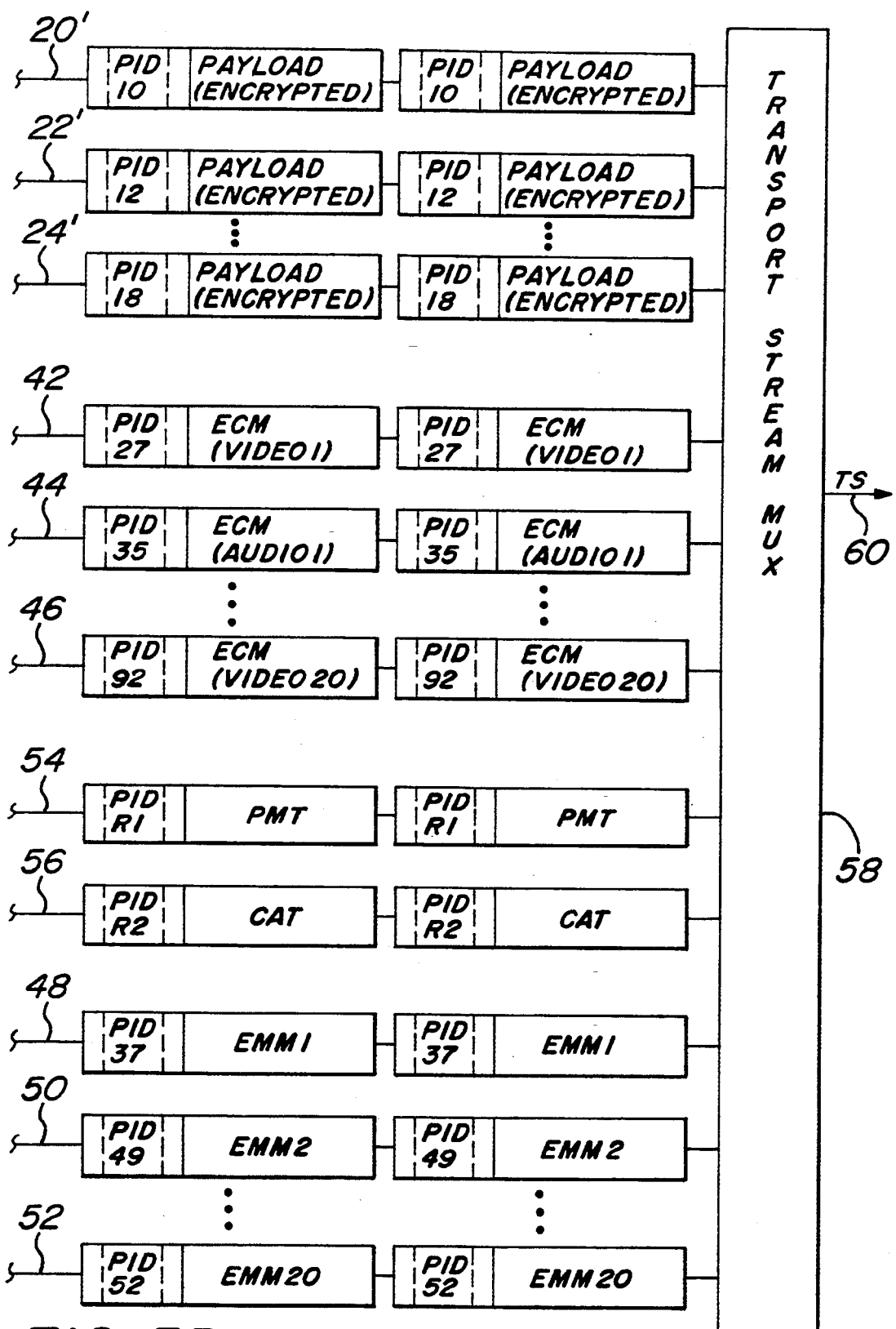

FIGS. 3A and 3B comprise a simplified, partial block diagram illustrating additional details of the encoder/multiplexer 11 of FIG. 2. As mentioned above, the encoder/multiplexer 11 generates a Transport Stream in accordance with the MPEG-2 Systems standard and provides conditional access information in accordance with the methods of the present invention. In use, a plurality of elementary streams (i.e., coded representations of the video and audio signals Video 1, Audio 1 . . . Video N) are provided, after first being packetized into respective Packetized Elementary Streams, to a transport level packetizer 18 via lines 12, 14 . . . 16, respectively. As explained above, in accordance with the MPEG-2 Systems standard, each elementary stream is assigned a unique Packet ID (PID) that is used to identify that stream. In the example illustrated in FIGS. 3A and 3B, the video elementary stream "Video 1" has been assigned a PID of '10', the audio elementary stream "Audio 1" has been assigned a PID of '12', and the video elementary stream "Video N" has been assigned a PID of 18.

The transport level packetizer 18 operates in accordance with the MPEG-2 Systems standard to segment each Packetized Elementary Stream (e.g., Video 1, Audio 1 ... Video N) and to insert successive segments of each stream into the payload sections of a respective sequence of Transport Packets. In the example illustrated in FIGS. 3A and 3B, the transport level packetizer 18 generates a sequence of Transport Packets 20 that contain the Packetized Elementary Stream data for "Video 1". A sequence of Transport Packets 22 carries the Packetized Elementary Stream data for "Audio 1", and a sequence of Transport Packets 24 carries the Packetized Elementary Stream data for "Video N". Each Transport Packet in a given sequence has a header 26 that contains the PID value 30 associated with the elementary stream carried in that sequence of Transport Packets. For example, a PID value of '10' is inserted into the header of each packet in the sequence of packets 20 that carries the Packetized Elementary Stream data for "Video 1", a PID value of '12' is inserted into the header of each packet in the sequence of packets 22 that carries the Packetized Elementary Steam data for "Audio 1", and so on.

For purposes of illustration only, it is assumed that the encoder 11 of FIGS. 3A and 3B will encrypt the elementary stream data in each respective sequence of Transport Packets 20, 22 . . . 24 in accordance with a private key cryptographic technique, such as the well known Data Encryption Standard (DES). It is understood, however, that the particular encryption or scrambling technique employed is not critical to the present invention. Rather, as will become evident hereinafter, the present invention may be employed with any encryption scheme in which it is necessary to provide stream-specific encryption related information to a decoder for decryption purposes.

As shown in FIGS. 3A and 3B, each sequence of Transport Packets 20, 22 . . . 24 is fed to an encryptor apparatus 32, which in the present example operates in accordance with a private key cryptographic technique to uniquely, and individually, encrypt the elementary stream data carried in the payload sections of the Transport Packets of each sequence 20, 22 . . . 24. Unique encryption control words are generated for each sequence of Transport Packets 20, 22 . . . 24 at block 34 and are provided to the encryptor apparatus 32 via line 35. The encryptor apparatus 32 encrypts the payload sections of the Transport Packets of each sequence 20, 22 . . . 24 and then provides each encrypted sequence of Transport Packets 20', 22' . . . 24' to a transport stream multiplexer 60. As dictated by the MPEG-2 Systems standard, the Transport Packet headers are not encrypted.

As explained in the Background of the Invention, in accordance with most any encryption or scrambling technique, encryption related information must be provided to decoders in order to enable the decoders to decrypt or descramble the encrypted data. In the present example, in which a private key cryptographic technique is employed to uniquely encrypt the elementary stream data in the Transport Packets of each sequence 20, 22 . . . 24, the unique encryption control words used to encrypt each sequence of Transport Packets 20, 22 . . . 24 must be provided to the decoders. It was decided by the drafters of the MPEG-2 Systems standard, including Applicant, that such encryption related information is to be provided in the form of Entitlement Control Messages (ECMs). In the present example, an ECM will contain one or more of the encryption control words used to encrypt the data of a particular elementary stream. As noted in the Background of the Invention, the MPEG-2 Systems standard does not specify the format of an ECM. Consequently, the format of an ECM may be tailored to a particular encryption/scrambling scheme.

As further illustrated in FIGS. 3A and 3B, and in accordance with an aspect of the present invention, the ECMs for each elementary stream are inserted into respective Transport Packets. For example, in FIGS. 3A and 3B, the ECMs for the elementary stream "Video 1" are inserted into one or more Transport Packets 42, the ECMs for the elementary stream "Audio 1" are inserted into one or more Transport Packets 44. As further illustrated, each Transport Packet that contains ECM data for a given elementary stream is assigned the same, unique PID value. For example, each of the Transport Packets 42 containing ECMs for the video elementary stream "Video 1" is assigned a PID value of '27', each of the Transport Packets 44 containing ECMs for the audio elementary stream "Audio 1" is assigned a PID value of '35', and so on.

As applicant recognized, some mechanism must be provided for associating each encrypted elementary stream with the Transport Packets that carry the ECMs for that stream. According to the present invention, such an association or mapping is provided as part of a Program Map Table (PMT) transmitted to each decoder. As explained in the Background of the Invention, the main function of a Program Map Table is to specify, for each user selectable program number, which elementary streams "make-up" that program. More specifically, the Program Map Table contains a "program definition" for each user selectable program number, and the program definition for a given program lists the Packet IDs associated with each elementary stream of that program. When a user selects a given program, the decoder can access the Program Map Table to obtain the PIDs associated with each elementary stream in that program. Thereafter, the decoder can simply extract every incoming Transport Packet having a PID that matches one of those listed in the program definition for the selected program.

According to the present invention, additional information is provided in the Program Map Table that specifies, for each elementary stream, the PID associated with the Transport Packets that contain the ECMs for that elementary stream. FIG. 4 illustrates the general content and arrangement of a Program Map Table 68 that incorporates such additional information in accordance with a preferred embodiment of the present invention. As shown, the Program Map Table 68 comprises a Program_Map_Table_Length field 70, which specifies the overall length (in bytes) of the entire Table 68, followed by one program definition 72 for each user selectable program. Each program definition 72 begins with a program number field 74 that specifies the assigned program number for the program being defined. The program number field 74 may be followed by a number of other fields 76 containing program related information not relevant to the present invention. An elementary_PID_count field 78 specifies the number of different elementary streams that "make-up" the defined program. An elementary_stream definition 80 is then provided for each of those elementary streams. Each elementary_stream definition 80 contains an elementary_PID field 82 that specifies the unique PID associated with the Transport Packets that carry that elementary stream of the defined program. According to the present invention, each elementary_stream definition 80 further contains an ECM_ID field 84 that specifies the PID value assigned to the Transport Packets that carry the ECMs for the elementary stream identified in the elementary_PID field 82. Accordingly, when a decoder accesses the Program Map Table to determine the PID values for each elementary stream in a given program, the decoder can also obtain the PID values assigned to the Transport Packets that carry the ECMs for each of those streams. Applicant, on behalf of his Assignee, proposed this aspect of the present invention for inclusion in the MPEG-2 Systems specification, and the technique, as defined by the appended claims, was substantially adopted as part of that standard. The Program Map Table structure originally proposed by Applicant and illustrated in FIG. 4 is expressed in Table 1 in the formal grammar of the MPEG-2 Systems Committee Draft.

TABLE 1

Program Map Table Syntax

| Syntax | # Bits |
|---|---|
| program_map_table ( ) { | |
|   program_map_table_length | 8 |
|   for(i=0;i<N;i++) { | |
|     program_number | 16 |
|     other | xx |
|     elementary_PID_count | 8 |
|     for(i=o; i<elementary_PID_count;i++) { | |
|       elementary_PID | 13 |
|       ECM_PID | 13 |
|       other | xx |
|     } | |
|   } | |
| } | |

Referring again to FIGS. 3A and 3B, the Program Map Table is inserted into one or more Transport Packets 54 for transmission to decoders. In the present embodiment, a PID value, R1, is reserved for those packets. That is, any Transport Packets containing all or a part of the Program Map Table are assigned a PID value of 'R1'. Reserving a PID value in this manner simplifies decoder access to the Program Map Table, since the reserved PID value may be permanently stored, or hard-wired, in each decoder. It should be noted, however, that the MPEG-2 Systems Committee Draft specifies a more elaborate technique that allows each program definition to be transmitted with its own unique PID value. An additional table, referred to in the MPEG-2 Systems Committee Draft as a Program Association Table, is then provided to map each user selected program number to the PID value of the Transport Packet(s) that contain the program definition for that program number. A PID value of '0' is reserved for the Program Association Table. As can be appreciated, however, the more complex technique specified in the MPEG-2 Systems Committee Draft is not necessary for practicing the present invention.

According to another aspect of the present invention, Entitlement Management Messages, which typically contain decoder specific and/or system-wide conditional access information, are received from the control computer 47 (FIG. 2) and are inserted into respective Transport Packets for transmission to decoders. Because different decoders are likely to operate in accordance with different conditional access systems (i.e., different encryption techniques and different program authorization formats), EMMs must be generated separately to support each such conditional access system. An EMM is typically addressed to a specific decoder or group of decoders in the communications system. Some applications, such as subscription television applications, are likely to employ millions of individual decoders, and therefore, it is likely that a correspondingly large number of EMMs will be required to support each of the different conditional access systems employed by those decoders. A collection of EMMs associated with a given conditional access system are sometimes referred to herein as an "EMM stream".

According to the present invention, the EMM streams for each of the different conditional access systems being employed by various decoders in the communications system are inserted into respective Transport Packet sequences, and a unique PID value is assigned to each sequence. For example, as illustrated in FIGS. 3A and 3B, the EMM stream denoted EMM, is inserted into the payload portions of a sequence of Transport Packets 48 that have been assigned a PID value of '7'. Accordingly, the headers of each Transport Packet in that sequence contain a PID value of '7'. Similarly, the EMM stream denoted EMM₂ is inserted into the payload portions of a sequence of Transport Packets 50 that have been assigned a PID value of '49'. A different PID value is associated with each of the different EMM streams.

Further in accordance with the present invention, each conditional access system employed in the communications system is assigned a unique conditional access system ID (CA_System_ID). Each decoder in the system is provided with the CA_System_ID associated with the conditional access system implemented by that decoder. The encoder 11 generates a conditional access table that specifies, for each of the different conditional access systems, which of the EMM streams is applicable to that conditional access system. More specifically, the conditional access table specifies, for each conditional access system, the PID value assigned to the Transport Packets carrying the EMM stream for that conditional access system.

Figure 1:
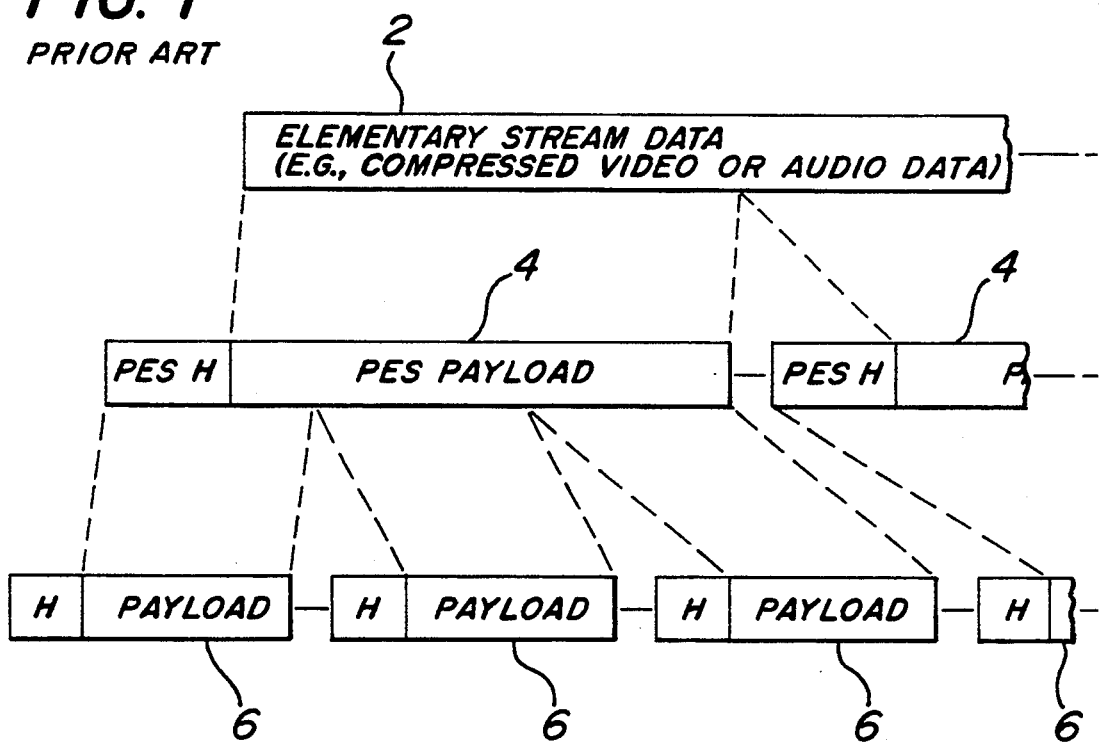
FIG. 1 graphically illustrates the two-level packetization scheme of the MPEG-2 Systems standard (ISO 13818)
Figure 5:
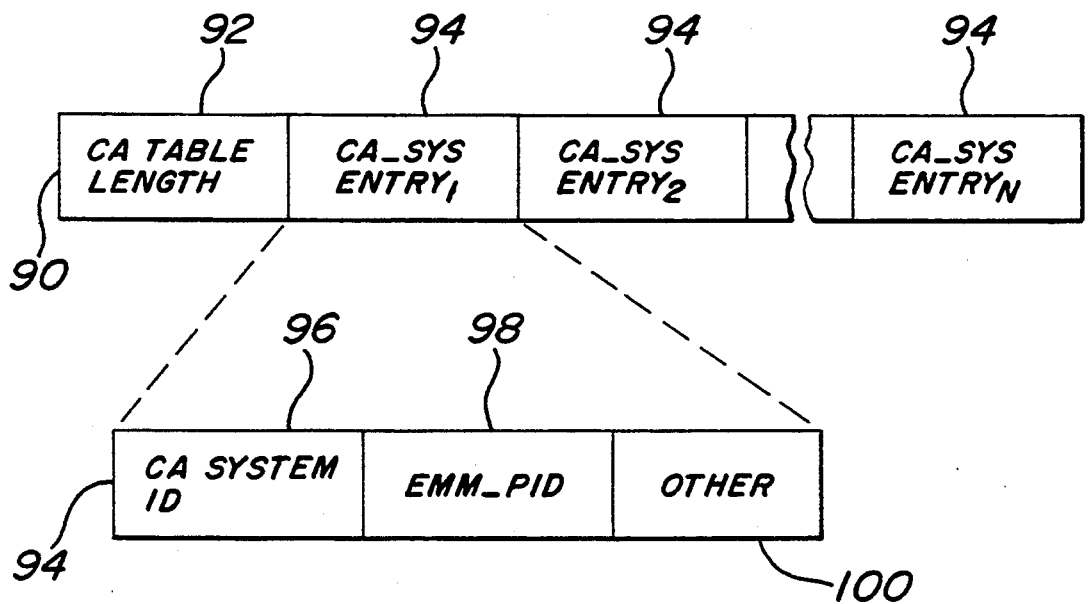
FIG. 5 illustrates the general content and arrangement of a Conditional Access Table in accordance with an embodiment of the present invention.

FIG. 5 illustrates the general content and arrangement of a conditional access table 90 according to a preferred embodiment of the present invention. As shown, the conditional access table 90 begins with a conditional access table length field 92 that specifies the overall length of the conditional access table 90. The length field 92 is followed by a plurality of table entries 94 - one for each of the N different conditional access systems employed by the various decoders in the system. Each entry 94 comprises a CA_System_ID field 96, which contains the unique ID assigned to the particular conditional access system being defined in that entry, and an EMM_PID field 98 that specifies the PID of the Transport Packets that carry the EMM stream associated with the conditional access system identified in the CA_System_ID field 96. The structure of a conditional access table in accordance with the present invention is expressed in Table 2 in the formal grammar of the MPEG-2 Systems Committee Draft.

TABLE 2

Conditional Access Table Syntax

| Syntax | # Bits |
|---|---|
| CA_table ( ) { | |
|   CA_table_length | 8 |
|   for (i=0; i<N; i++) { | |
|     CA_System_ID | 16 |
|     EMM_PID | 13 |
|     Other | xx |
|   } | |
| } | |

Referring again to FIGS. 3A and 3B, the conditional access table is inserted into one or more Transport Packets 56 for transmission to each decoder. A unique PID value, R2, is reserved for these Transport Packets 56. That is, any Transport Packet 56 that contains all or a portion of the conditional access table carries a PID value of R2 in its header. The reserved PID Value can be stored, or hard-wired, into each decoder. Upon receiving a given Transport Stream, a decoder can automatically extract+every incoming Transport Packet having a PID value that matches the value, R2, reserved for the conditional access table.

As can be appreciated, the use of a conditional access table in accordance with the present invention enables different decoders, each operating in accordance with a different conditional access system, to be employed in the same communications system. Each decoder can retrieve its associated EMM stream by first accessing the transmitted Conditional Access Table to determine the PID value of the Transport Packets that carry that EMM stream, and then extracting every incoming Transport Packet whose PID value matches the specified value. Applicant, on behalf of his Assignee, proposed this aspect of the present invention for inclusion in the MPEG-2 Systems specification, and the technique, as defined by the appended claims, was substantially adopted as part of that standard. According to the MPEG-2 Systems Committed-Draft, a PID value of '1' is reserved for the Transport Packets that contain portions of a conditional access table (i.e., R2='1').

In the example illustrated in FIGS. 3A and 3B, the control computer 47 is responsible for generating the various EMM streams, the Program Map Table (PMT) and the Conditional Access Table (CAT) which are then respectively packetized in the encoder 11 at block 49. Each Transport Packet, including those containing the elementary stream data (e.g., packet sequences 20', 22' and 24') and the ECM data (e.g., packet sequences 42, 44 and 46), are provided to a transport stream multiplexer 58 that multiplexes the packets to form a single outgoing packet stream or "Transport Stream" on line 60. The Transport Stream is then transmitted via some medium (e.g. satellite 203 of FIG. 2) to various decoders in the communications system.

Figure 6:
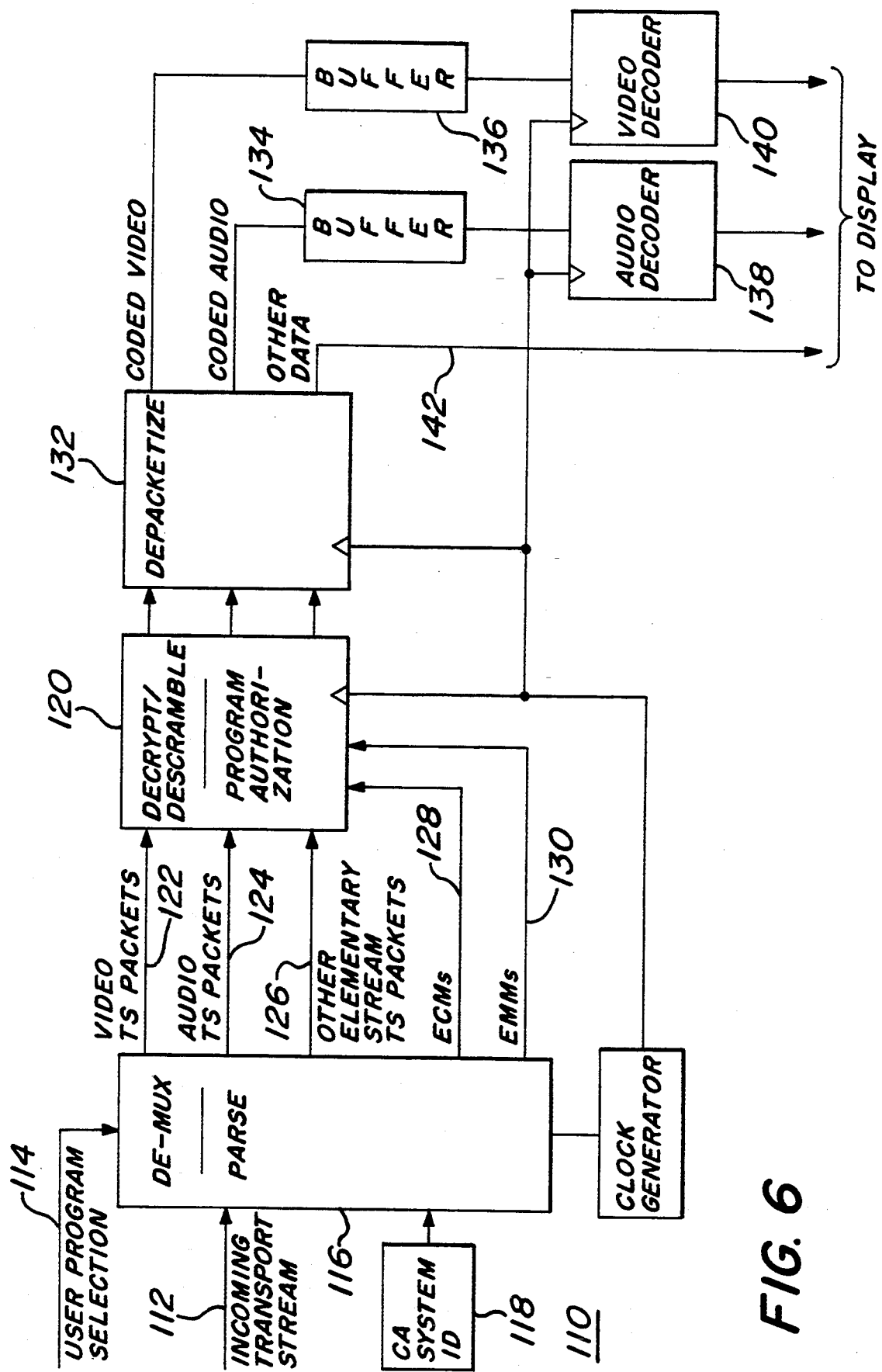
FIG. 6 is a functional block diagram of a decoder apparatus for receiving an MPEG-2 Transport stream and for extracting conditional access information in accordance with the methods of the present invention.

FIG. 6 is a simplified block diagram of an exemplary decoder 110 for receiving an MPEG-2 Transport Stream and for obtaining ECM and EMM data from the incoming Transport Stream in accordance with the methods of the present invention. The decoder 110 of FIG. 6 may be used to implement block 206 of FIG. 2. As shown in FIG. 6, a Transport Stream is received by the decoder 110 on line 112 and provided to a de-multiplexer/parsing unit 116. A user's program selection is provided to the demultiplexer 116 via line 114. A CA__ System ID code is stored in a memory 118. As described above, the CA__System__ID identifies the particular conditional access system (i.e., encryption algorithms, authorization information format, etc.) being employed by the decoder 118.

When a user selects a given program for output, the demultiplexer 116 first retrieves the incoming Transport Packets having the PID value that was reserved for the Program Map Table. Once received, the demultiplexer 116 then accesses the Program Map Table to find the program definition for the program number selected by the user. The decoder then examines the appropriate program definition to identify the PIDs of the Transport Packets that carry each of the elementary streams (e.g., video, audio, etc.) that "make-up" the selected program. Thereafter, the demultiplexer 116 begins extracting every incoming Transport Packet having a PID that matches one of those listed in the program definition. For example, referring briefly to FIGS. 3A and 3B, a subscriber may select a program that consists of elementary streams "Video 1" and "Audio 1." Transport Packets carrying the elementary stream data for "Video 1" each have a PID of '10', and the Transport Packets carrying the elementary stream data for "Audio 1" each have a PID of '12'. As successive packets of the Transport Stream are received, the demultiplexer 116 will extract every incoming Transport Packet having a PID of '10' or '12'.

According to the present invention, the demultiplexer/parsing unit 116 also accesses the program definition for the selected program to determine the PIDs of the Transport Packets that contain the ECMs for each elementary stream of the selected program. As described above, each elementary stream is uniquely, and individually, encrypted or scrambled by scrambling the payload sections of the Transport Packets that carry each respective elementary stream. The ECMs for a given elementary stream contain encryption related information necessary for decrypting that elementary stream. Once the demultiplexer 116 has identified the PIDs of the Transport Packets that contain the ECMs for each respective elementary stream of the selected program, the demultiplexer extracts those Transport Packets as they are received in the incoming Transport Stream.

As the Transport Packets that contain the data for each elementary stream of the selected program are retrieved from the incoming Transport Stream, they are provided, in sequence, to a decryption/descrambling and program authorization unit 120. For example, the Transport Packets carrying video elementary stream data are provided to the decryption/descrambling unit 120 via line 122. Transport Packets carrying audio elementary stream data are provided to the unit 120 via line 124. Transport Packets containing other types of elementary stream data may be provided to the unit 120 via line 126.

Additionally, as the Transport Packets that contain the ECMS for each elementary stream of the selected program are received, the demultiplexer 116 provides those ECMs to the decryption/descrambling unit 120 via line 128. In accordance with the encryption/decryption scheme employed by the particular conditional access subsystem of the decoder 110, the decryption/-descrambling unit 120 employs the information contained in the ECMs for each elementary stream to decrypt or descramble the payload sections of the Transport Packets that carry each respective elementary stream.

Further in accordance with the present invention, the demultiplexer/parsing unit 116 extracts any incoming Transport Packets that have a PID value that matches the value reserved for the conditional access table. From these Transport Packets, the conditional access table is obtained. Using the CA__System__ID assigned to the decoder and stored at 118 as an index into the conditional access table, the decoder accesses the conditional access table to determine the PID associated with the Transport Packets that carry the EMM stream for the conditional access system employed by the decoder 110. The decoder 110 thereafter extracts every incoming Transport Packet having the PID value specified in the conditional access table. As each such Transport Packet is extracted, the Entitlement Management Messages (EMMs) in the packets are extracted and provided to the decryption/descrambling unit 120 via line 10.

As explained above, EMMs may contain decoder specific information, such as program authorization information, as well as system-wide conditional access information. A given EMM may be addressed to a specific decoder, a selected group of decoders, or all decoders operating in accordance with the corresponding conditional access system. Assuming that the information contained in an EMM addressed to the decoder 110 authorizes the decoder to retrieve and output the program selected by the user, the decrypting/descrambling unit 120 will provide the decrypted/descrambled Transport Packets for each elementary stream of that program to a depacketizer 10. Depacketizer 10 operates in accordance with the MPEG-2 Transport Stream protocol to recover the raw elementary stream data of each elementary stream of the selected program. Audio and video related elementary stream data is provided to respective buffers 134, 136 and then to respective decoders 138, 140 which decode the elementary stream data to produce analog video and audio signals for output to a display device (not shown). Other elementary stream data, such as, for example, teletext or computer data may be output via line 142 to an appropriate device (not shown).

Figure 7A:
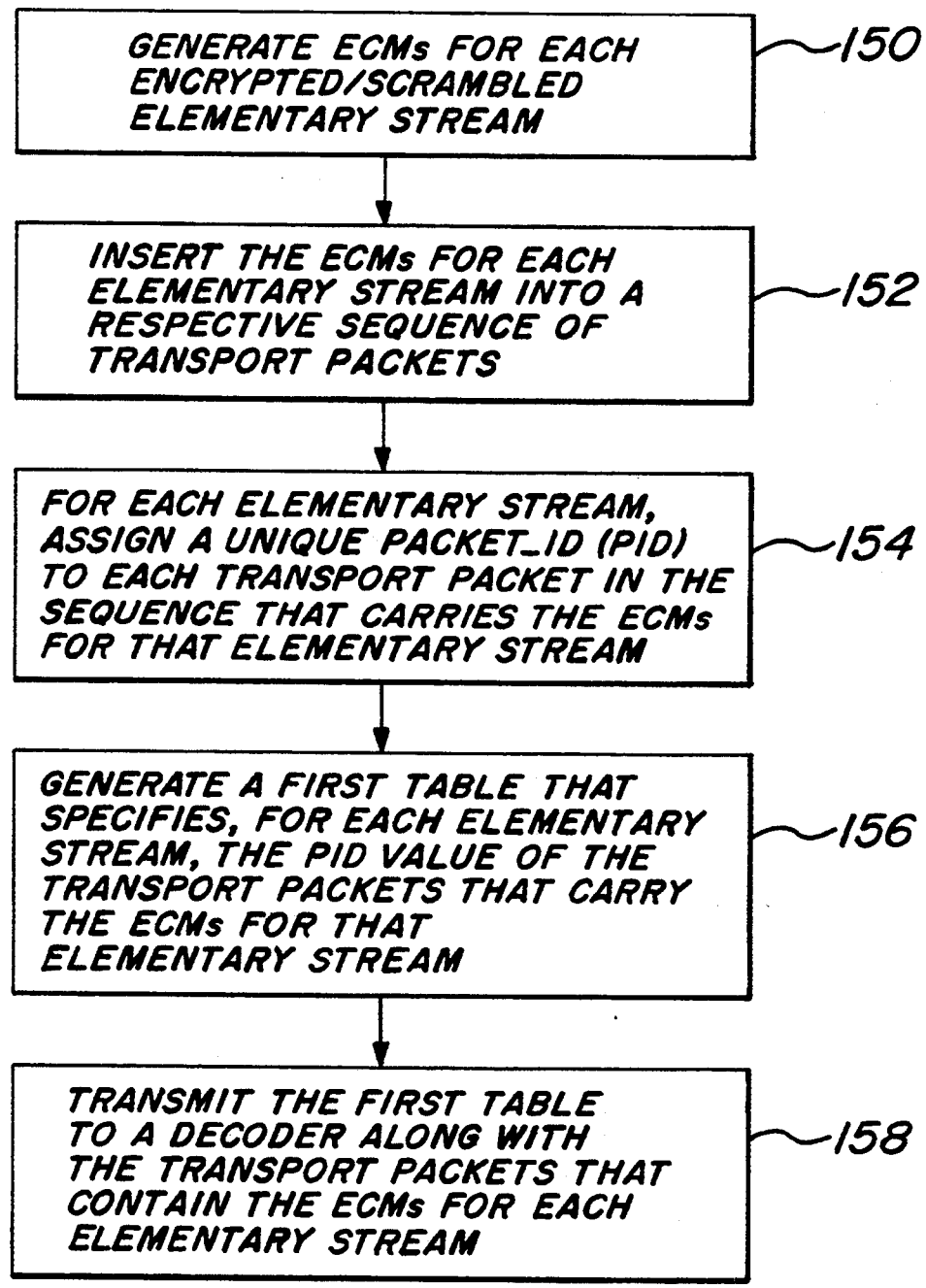
FIGS. 7A and 7B are flow diagrams illustrating the steps to be performed at an encoder apparatus in accordance with a preferred embodiment of the methods of the present invention.

FIG. 7A is a flow diagram illustrating both the operation of the encoder 11 of FIGS. 3A and 3B and a preferred embodiment of one aspect of the method of the present invention. According to the method of the present invention, at step 150, the encoder generates an appropriate set of Entitlement Control Messages (ECMs) for each encrypted/scrambled elementary stream to be transmitted by the encoder. As explained above, the ECMs for a given elementary stream contain the encryption-related information needed by a decoder to decrypt the encrypted data for that elementary stream. Next, at step 152, the ECMs for each elementary stream are inserted into respective sequences of Transport Packets (e.g., the Transport Packet sequences 42, 44 . . . 46 of FIGS. 3A and 3B). At step 154, for each elementary stream, the encoder assigns a unique Packet_ID (PID) to each Transport Packet in the sequence that carries the ECMs for that elementary stream. For example, in the example illustrated in FIGS. 3A and 3B, each Transport Packet in the sequence of Transport Packets 42 that carry the ECMs for video elementary stream "Video 1" is assigned a PID value of '27'.

Next, at step 156, the encoder generates additional information in the form of a first table that specifies, for each elementary stream, the PID value of the Transport Packets that carry the ECMs for that elementary stream. As explained above, in the present embodiment, this "first table" is incorporated as part of a Program Map Table that contains a program definition for each user selectable program transmitted in the Transport Stream generated by the encoder. FIG. 4 and Table 1 illustrate one embodiment of a Program Map Table that includes the additional information generated by the encoder 11 in accordance with the present invention. It should be noted, however, that this information (i.e., a listing of the PIDs of the Transport Packets that contain the ECM data for each elementary stream) does not have to be incorporated in a Program Map Table or similar structure. Rather, if desired, the additional information (i.e., "first table") may be transmitted separately from the Program Map Table.

Finally, at step 158, the Program Map Table is transmitted to one or more decoders in the system along with the Transport Packets that contain the ECMs for each elementary stream. As described above, in the present embodiment, the Program Map Table is inserted in dedicated Transport Packets (e.g. Packets 54 of FIGS. 3A and 3B), and the Transport Packets that contain all or part of the Program Map Table are assigned a reserved PID value, $R_1$. The reserved PID, $R_1$, can be stored, or hard-wired, in each decoder to facilitate extraction of the Program Map Table at each decoder. As further explained above, the MPEG-2 Systems Committee Draft specifies a more elaborate technique in which each program definition of the Program Map Table may be transmitted in a Transport Packet having its own unique PID value. An additional table, referred to in the MPEG-2 Systems Committee Draft as a Program Association Table, is then provided to map each user selected program number to the PID value of the Transport Packet(s) that contain the program definition for that program number. A PID value of '0' is reserved for the Program Association Table. As mentioned above, however, the more complex technique specified in the MPEG-2 Systems Committee Draft is not necessary for practicing the present invention.

Figure 7B:
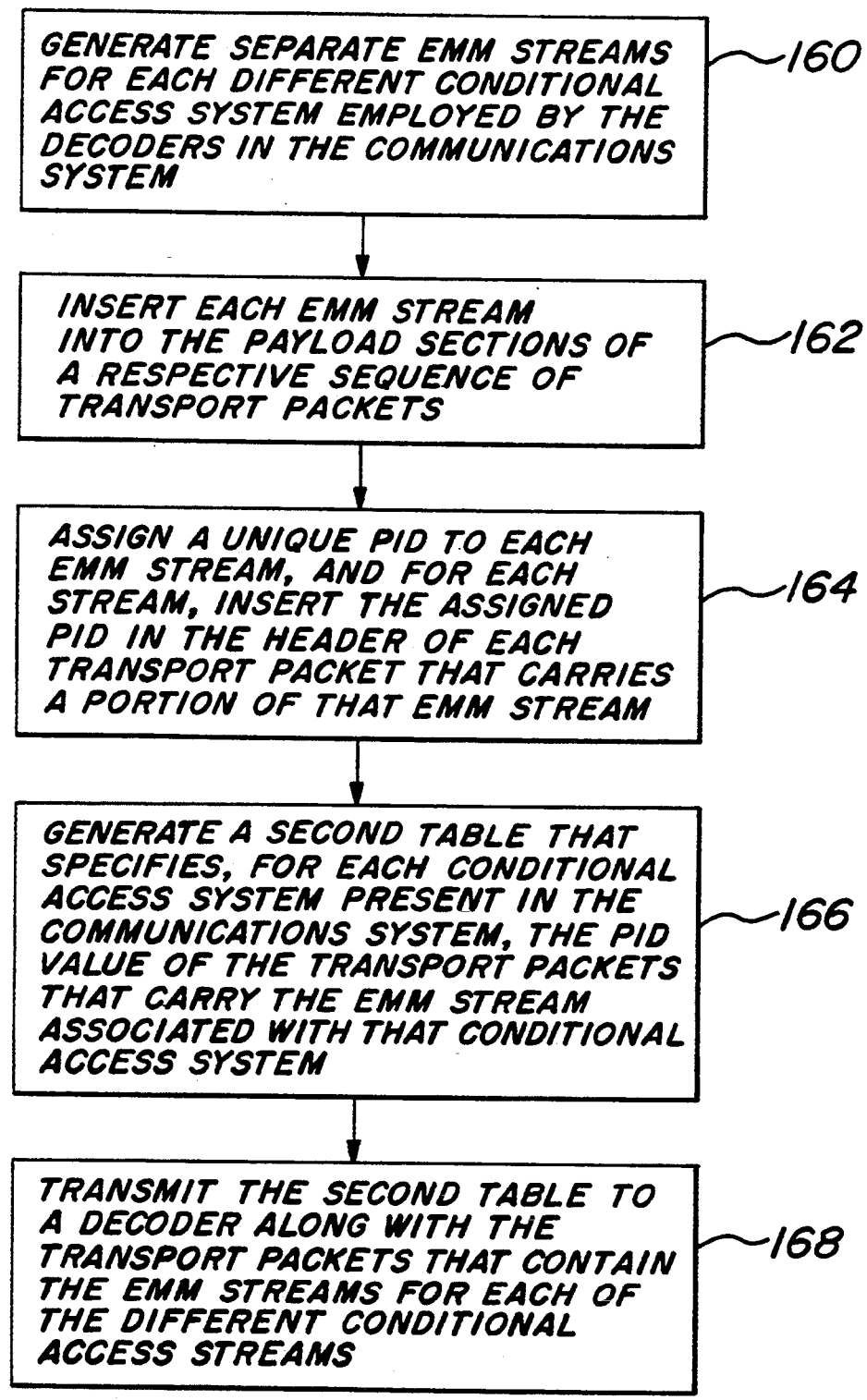

FIG. 7B illustrates a number of additional steps that are performed by the encoder in accordance with another aspect of the method of the present invention. In particular, the steps of FIG. 7B illustrate a method for providing separate Entitlement Management Messages (EMMs) to decoders in a Packet-based communications system, wherein different decoders operate in accordance with different conditional access systems. The term "conditional access system" refers to a particular decoder's implementation of access related techniques such as encryption or scrambling techniques and programming authorization techniques. As illustrated in FIG. 7B, at step 160, the encoder receives a plurality of different EMM streams from the control computer 47, one for each of the different conditional access systems employed by the various decoders in the communications system. At step 162, each of the different EMM streams is inserted into the payload sections of a respective sequence of Transport Packets (e.g., Transport Packet sequences 48, 50 . . . 52 of FIGS. 3A and 3B). At step 164, the encoder assigns a unique PID to each EMM stream, and for each stream, inserts the assigned PID in the header of each Transport Packet that carries a portion of that EMM stream.

Next, at step 166, the encoder generates a second table, defined herein as a conditional access table, that specifies, for each conditional access system present in the communications system, the PID value of the Transport Packets that carry the EMM stream associated with that conditional access system. A preferred structure for the conditional access table (i.e., "second table") is illustrated in FIG. 5, as well as in Table 2. At step 168, the decoder transmits the conditional access table (CAT) to each decoder in the system along with the Transport Packets that contain the EMM streams for each of the different conditional systems employed. As described above, in the present embodiment, the Conditional Access Table is inserted into one or more Transport Packets for transmission to each decoder. A unique PID value, $R_2$, is reserved for the Transport Packets that carry the Conditional Access Table. As explained above, after adopting this aspect of the present invention, the drafters of the MPEG-2 Systems standard assigned a reserved PID value of '1' to the Transport Packets that carry the Conditional Access Table. The reserved PID value, $R_2$, can be stored or hard-wired in each decoder to facilitate extraction of the Conditional Access Table by each decoder.

Figure 8A:
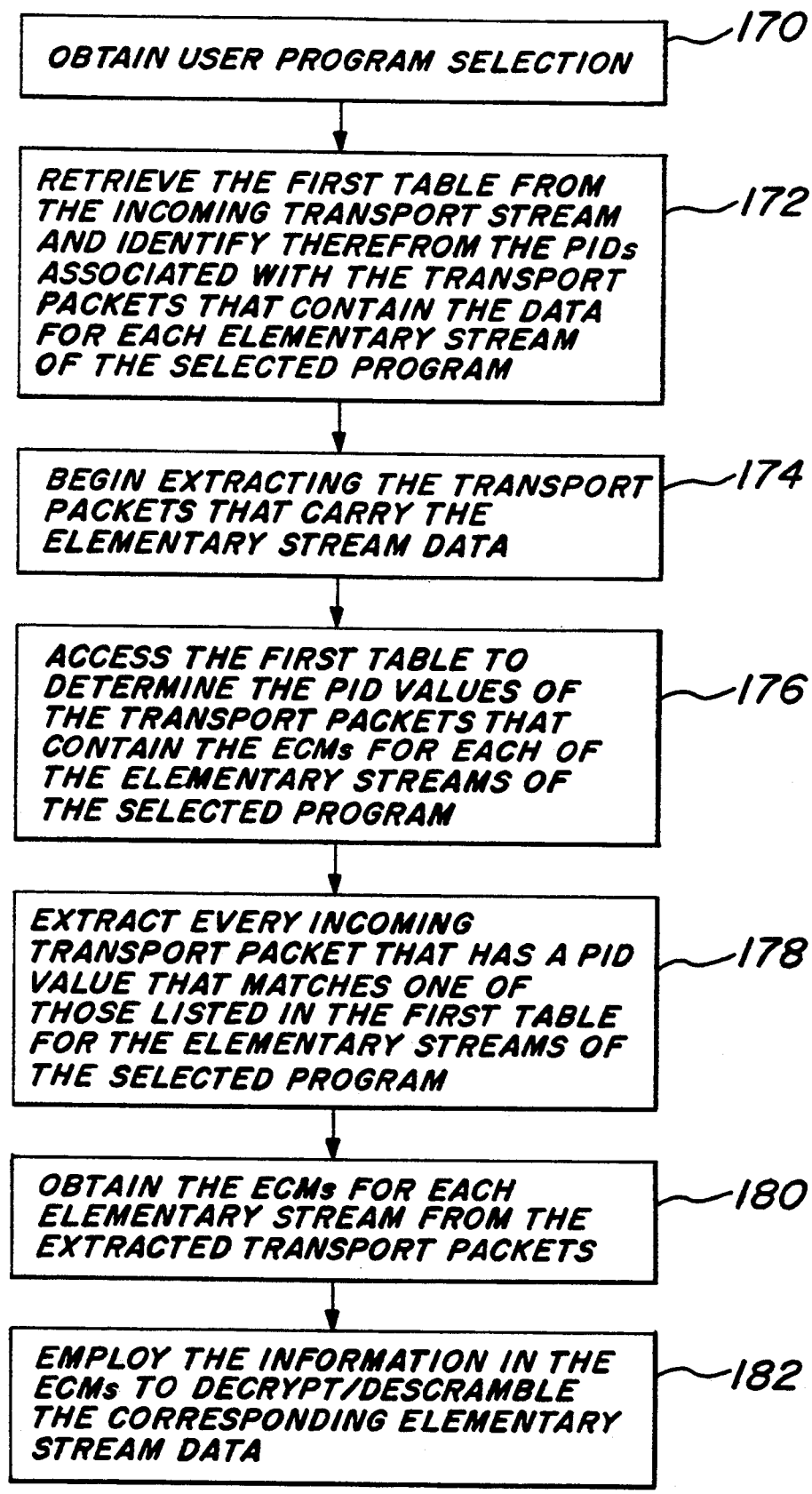
FIGS. 8A and 8B are flow diagrams illustrating the steps to be performed at a decoder apparatus in accordance with a preferred embodiment of the methods of the present invention.

FIG. 8A illustrates the steps to be performed by a decoder, such as the decoder 110 of FIG. 6, in accordance with a preferred embodiment of the methods of the present invention. As shown in FIG. 8A, at step 170, the decoder obtains a user's program selection. At step 172, the decoder extracts the Transport Packets that contain the Program Map Table from the incoming Transport Stream and retrieves the Program Map Table from those packets. As explained above, in the present embodiment, the "first table" described above is incorporated as part of the Program Map Table. A PID value, $R_1$, is reserved for the Transport Packets that contain the Program Map Table. After retrieving the Program Map Table, the decoder accesses the Program Map Table to obtain the program definition for the program selected by the user. From the program definition for the selected program, the decoder determines the Packet_IDs (PIDs) associated with the Transport Packets that carry the data for each elementary stream of the selected program. Thereafter, at step 174, the decoder begins extracting every incoming Transport Packet whose PID value matches one of those listed in the program definition for the selected program.

At step 176, the decoder accesses the additional conditional access related information incorporated in the Program Map Table in accordance with the present embodiment of the invention. As explained above, that information specifies, for each elementary stream, the PID value of the Transport Packets that carry the ECMs needed for decrypting that elementary stream. In the present embodiment, the PIDs of the Transport Packets that carry the ECMs for the elementary streams of the selected program are identified in the program definition for that program. Thus, in step 176, the decoder again accesses the program definition for the selected program and determines therefrom the PID values of the Transport Packets that contain the ECMs for each of the elementary streams of that program. Thereafter, at step 178, the decoder begins extracting every incoming Transport Packet that has a PID value that matches one of those listed in the program definition. The individual ECMs for each elementary stream are then retrieved from the extracted Transport Packets and employed by the decryption/descrambling unit in the decoder to decrypt/descramble the corresponding elementary stream data, as illustrated at steps 180 and 182.

Figure 8B:
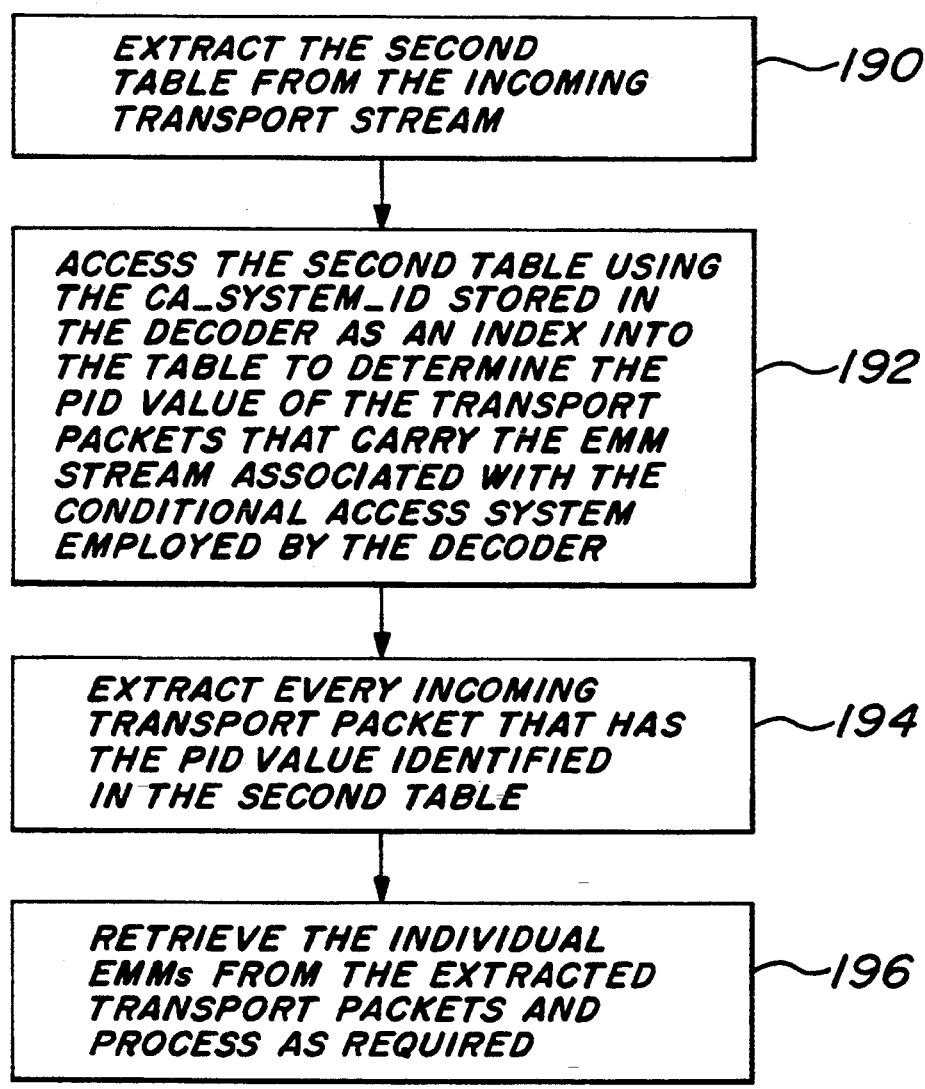

FIG. 8B illustrates additional steps to be performed by a decoder in accordance with the methods of the present invention. In particular, FIG. 8B illustrates the steps to be performed by the decoder in order to obtain the Entitlement Management Messages (EMMs) that pertain to the particular conditional access system employed by the decoder. As explained above, each decoder is provided with a CA_System_ID that identifies the particular conditional access system employed by that decoder. As shown at step 190, in accordance with the present invention, the decoder first extracts the conditional access table (i.e., "second table") from the incoming Transport Stream. As explained above, the Conditional Access Table is transmitted to the decoder in one or more Transport Packets having a second reserved PID value, $R_2$. Accordingly, the decoder can obtain the Conditional Access Table by extracting any incoming Transport Packets that have that reserved PID value.

Once the Conditional Access Table has been obtained, the decoder uses the CA_System_ID stored in the decoder as an index into the table to determine the PID value of the Transport Packets that carry the EMM stream that pertains to the particular conditional access system identified by the decoder's CA_System_ID. Thereafter, at step 194, the decoder begins extracting every incoming Transport Packet that has the PID value associated with that EMM stream. The individual EMMs may then be retrieved from the extracted Transport Packets and processed accordingly.

As the foregoing illustrates, the present invention is directed to methods for providing conditional access information to decoders in a packet-based multiplexed communications system. One aspect of the present invention is directed to a method for providing stream-specific encryption related information to a decoder and for facilitating decoder access to that information. Another aspect of the present invention is directed to a method for providing conditional access information for each of a number of different conditional access systems that may be employed by various decoders in a packet-based multiplexed communications system, and for facilitating access by each decoder to the conditional access information that pertains to the particular conditional access system implemented by that decoder. While the methods of the present invention have been described herein in the context of a packet-based multiplexed communications system operating substantially in accordance with the MPEG-2 Systems standard, it is understood that the present invention is by no means limited thereto. Rather, the present invention may be employed in any packet-based multiplexed communications system wherein conditional access information must be provided to decoders in the system. It is understood, therefore, that changes may be made to the embodiments described above without departing from the broad inventive concepts thereof. Accordingly, this invention is not limited to the particular embodiments disclosed, but is intended to cover all modifications that are within the scope and spirit of the invention as defined by the appended claims.

What is claimed is:

1. In a packet-based multiplexed communications system wherein a plurality of different elementary streams are each segmented and inserted into respective transport packets that are then multiplexed to form a single transport stream for transmission to a remote location, and wherein the elementary streams are separately and uniquely encrypted prior to transmission, and wherein encryption related information specific to each elementary stream is generated and must be provided to the remote location for decryption purposes, and further wherein different combinations of elementary streams define a plurality of different programs, a method of providing the encryption related information for each elementary stream to the remote location comprising the steps of:

a) for each elementary stream, inserting the encryption related information for that elementary stream into a respective sequence of transport packets;

b) generating, as part of a program map table that specifies, for each of said different programs, which of said elementary streams comprise said each program, a table that specifies, for each elementary stream of each program, which of the transport packets generated in step (a) carry the encryption related information for that elementary stream; and c) transmitting the program map table and the transport packets that carry the encryption related information for each elementary stream to the remote location as part of the transport stream along with the transport packets that carry the encrypted data of each elementary stream, whereby a decoder at the remote location can access the program map table to identify which elementary streams comprise a program selected by a user at that location, as well as to identify which transport packets transmitted in step (c) carry the encryption related information for the elementary streams of the selected program.

2. The method recited in claim 1 wherein step (a) further comprises, for each elementary stream, assigning a unique packet ID to the encryption related information for that elementary stream and inserting the assigned packet ID is a header section of each transport packet that carries a portion of the encryption related information for that elementary stream.

3. The method recited in claim 2 wherein said table specifies, for each elementary stream, the packet ID of the transport packets that carry the encryption related information for that elementary stream.

4. In a packet-based multiplexed communications system in which a plurality of different elementary streams are each segmented and inserted into respective transport packets that are then multiplexed to form a single transport stream for transmission to a plurality of different remote locations, each remote location employing a decoder, each decoder operating in accordance with one of a plurality of different conditional access systems, wherein different sets of conditional access information specific to each of the different conditional access systems must be provided to the remote locations, a method of providing the different sets of conditional access information to the remote locations comprising the steps of:

a) for each of said conditional access systems:
  i) inserting a set of conditional access information specific to that conditional access system into a respective sequence of transport packets;
  ii) assigning a unique packet ID to the set of conditional access information and inserting the unique packet ID in a header section of each transport packet in the respective sequence;

b) generating a conditional access table that specifies, for each of said different conditional access systems, the packet ID of the transport packets that carry the set of conditional access information specific to that conditional access system; and c) transmitting the conditional access table and the transport packets that carry each of the different sets of conditional access information to the remote location along with the transport packets that carry the different elementary streams, whereby a decoder at a remote location, which operates in accordance with one of said different conditional access systems, can employ the transmitted conditional access table to identify and extract the transport packets that carry the set of conditional access information specific to the conditional access system upon which that decoder operates.

5. The method recited in claim 4 wherein each of said different sets of conditional access information comprises a plurality of Entitlement Management Messages unique to a particular one of said different conditional access systems.

6. The method recited in claim 4 further comprising the steps of:
  i) assigning a unique conditional access system identifier (CA_System_ID) to each of the conditional access systems in operation within the communications system; and
  ii) providing each decoder in the communications system with the CA_System_ID of the conditional access system in accordance with which that decoder operates.

7. The method recited in claim 6 wherein said conditional access table comprises a plurality of entries, one entry for each conditional access system in operation within the communications system, each entry of the conditional access table comprising a first identifier that specifies the CA_System_ID of the conditional access system to which the entry pertains, and a second identifier that specifies the packet ID of the transport packets that carry conditional access information specific to the conditional access system identified by the CA_System_ID of that entry.

8. In a packet-based multiplexed communications system wherein a plurality of different elementary streams are each segmented and inserted into respective transport packets that are assigned a unique packet ID and then multiplexed to form a single transport stream for transmission to a remote location, different combinations of said elementary streams defining a plurality of different programs, and wherein the elementary streams are separately and uniquely encrypted prior to transmission and, for each elementary stream, encryption related information necessary for decrypting that elementary stream is inserted into a respective sequence of transport packets also being assigned a unique packet ID, and further wherein a program map table is transmitted in the transport stream that specifies, for each of said different programs, the packet IDs of the transport packets that carry each of the elementary streams that comprise said each program, said program map table further specifying, for each elementary stream of each program, the packet ID of the transport packets that carry the encryption related information for that elementary stream, a method of accessing a selected program for output at a remote location comprising the steps of:

a) receiving the transport stream at the remote location and retrieving the program map table from the received transport stream;

b) identifying from the program map table the packet IDs of the transport packets that carry the elementary streams of the selected program, and also identifying from the program map table the packet IDs of the transport packets that carry the encryption related information necessary for decrypting each elementary stream of the selected program;

c) extracting from the received transport stream the transport packets having the packet IDs identified in step (b) in order to retrieve and decrypt the elementary streams of the selected program for output at the remote location.

9. In a packet-based multiplexed communications system in which a plurality of transport packets are multiplexed to form a single transport stream for transmission to a plurality of different remote locations, each remote location employing a decoder and each decoder operating in accordance with one of a plurality of different conditional access systems, each conditional access system having a unique identifier (CA_System_ID) associated therewith and each decoder being provided with the CA_System_ID of the conditional access system in accordance with which it operates, and wherein, for each conditional access system, conditional access information specific to that conditional access system is transmitted to each remote location in a respective sequence of transport packets having a unique packet ID, and further wherein a conditional access table is transmitted in the transport stream that specifies, for each conditional access system operating in the communications system, the packet ID of the transport packets that carry the conditional access information specific to that conditional access system, a method of retrieving at a decoder the conditional access information specific to the conditional access system in accordance with which the decoder operates, said method comprising the steps of:

a) receiving the transport stream at the remote location;

b) accessing the conditional access table transmitted in the transport stream with the CA_System_ID provided to the decoder to identify the packet ID of the transport packets that carry conditional access information specific to the conditional access system of that decoder; and c) extracting from the transport stream the transport packets having the packet ID identified in step (b) in order to obtain the conditional access information specific to the conditional access system of the decoder.

* * * * *